Feb. 15, 1966 R. H. APPELDORN ETAL 3,234,868
COPYING APPARATUS
Filed Dec. 26, 1963 2 Sheets-Sheet 1
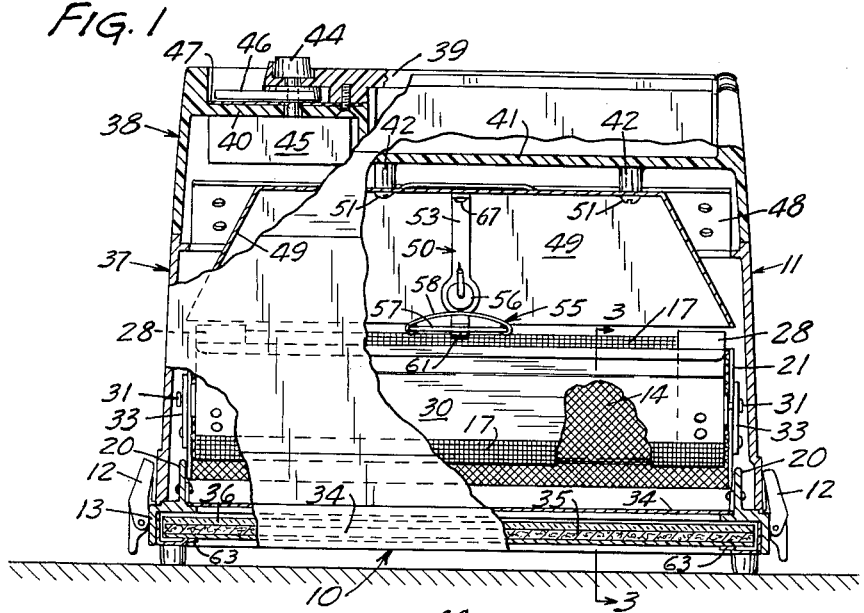
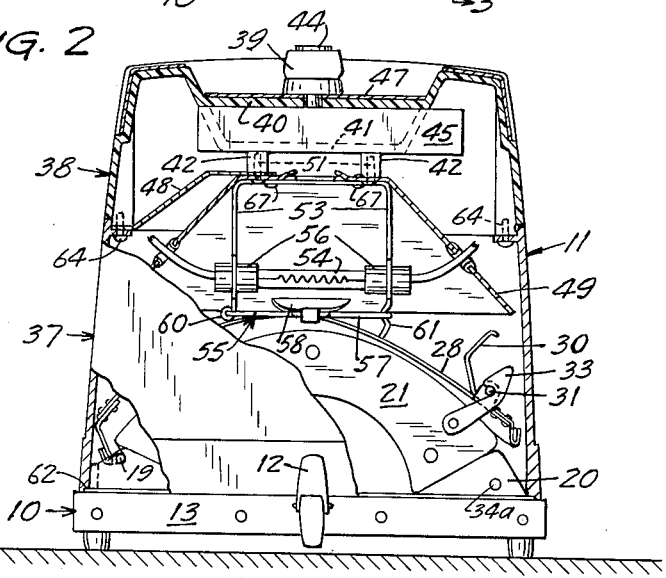
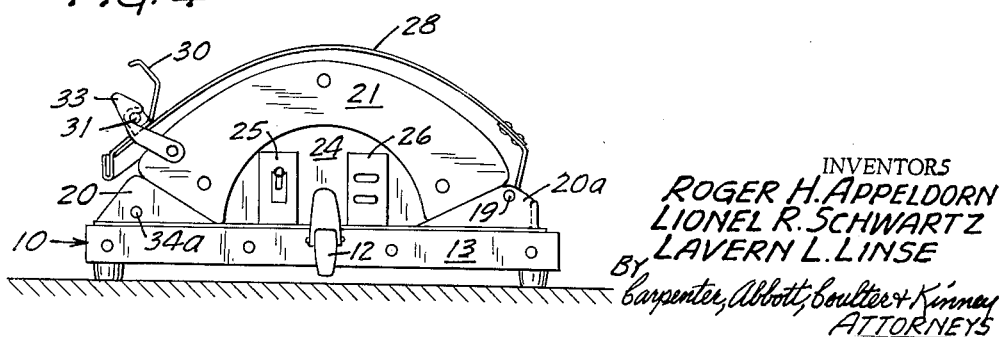
INVENTORS
ROGER H. APPELDORN
LIONEL R. SCHWARTZ
LAVERN L. LINSE
BY Carpenter, Abbott, Coulter & Kinney
ATTORNEYS Feb. 15, 1966  R. H. APPELDORN ETAL  3,234,868
COPYING APPARATUS
Filed Dec. 26, 1963
2 Sheets-Sheet 2
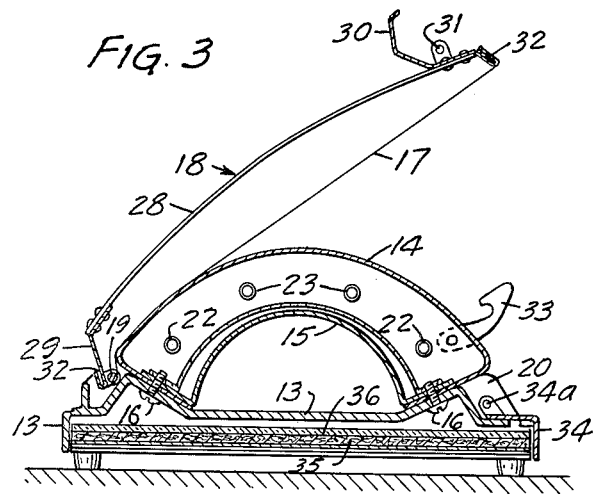
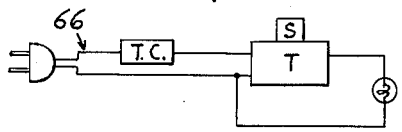
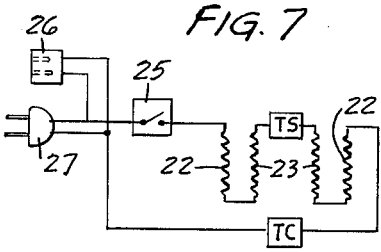
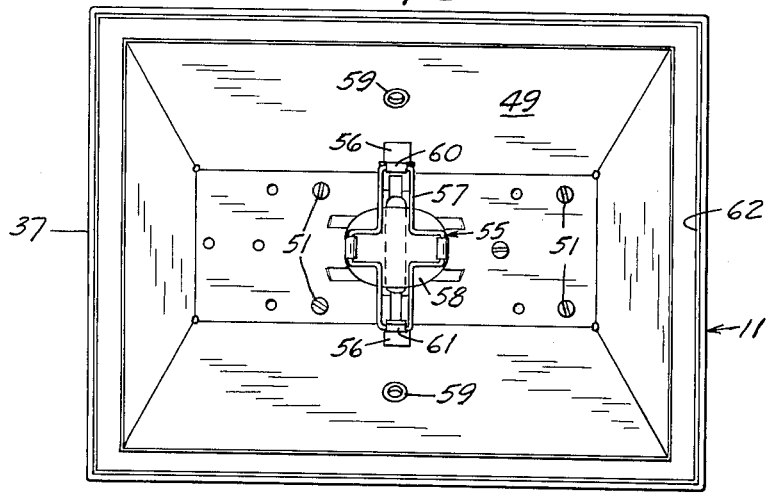
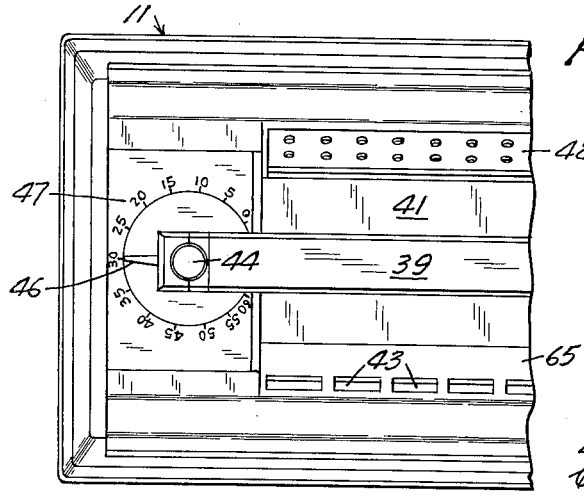
INVENTORS
ROGER H. APPELDORN
LIONEL R. SCHWARTZ
LAVERN L. LINSE
BY Carpenter, Abbott, Coulter & Kinney
ATTORNEYS

United States Patent Office 3,234,868
Patented Feb. 15, 1966

3,234,868
COPYING APPARATUS
Roger H. Appeldorn, White Bear Lake, Lionel R. Schwartz, St. Paul, and LaVern L. Linse, White Bear Township, Ramsey County, Minn., assignors to Minnesota Mining and Manufacturing Company, St. Paul, Minn., a corporation of Delaware
Filed Dec. 26, 1963, Ser. No. 333,445
7 Claims. (Cl. 95—73)

This invention relates to apparatus useful in the reproduction of graphic originals by methods employing both light and heat. In particular, the invention relates to compact portable apparatus with which to reproduce printed pages of books or magazines, office correspondence or other documents, portions of larger drawings or blueprints, and many other graphic originals in a rapid and efficient manner, requiring only a source of electrical power for the complete copying operation.

The method of copying, and suitable copy-sheet products for use therein, have previously been described. For example in Workman Patent No. 3,094,417 there is described a light-transmissive sensitized intermediate film member and a white coated receptor sheet. The film is first illuminated with a light-pattern, for example by exposure in reflex position over a printed original, to render the light-exposed background areas incapable of reaction with the receptor sheet coating. The film is then placed against the coated receptor and the composite is heated, causing an image-forming reaction to occur at the still reactive image areas and thereby forming on the receptor sheet a reproduction of the original image.

In the reflex position the sensitive film lies over the printed surface, i.e. between it and the light source. The light passes through the film, being absorbed at the black or colored imaged areas and reflected at the less absorptive white background areas. Some of the energy is also absorbed within the sensitive film, the action causing desensitization of the reactive coating. The exposure is continued for a time just sufficient to completely desensitize the doubly exposed film above the background areas, the film over the image areas thus retaining a degree of reactivity. The exposure therefore must be carefully controlled, and must be uniform over the entire area if effective copying is to be accomplished.

Attempts to provide uniform illumination, for example in photographic contact printing machines, have generally involved the use of a number of lamps arranged at a substantial distance from the surface to be illuminated and with one or more diffusing screens intermediate the lamps and surface. The present invention employs but a single high intensity lamp, held in surprisingly close proximity to the exposed surface, to provide a compact space-saving structure with not more than ±10% variation in light intensity over the entire area.

The exposure component of the apparatus serves as a cover for the heater component, the latter in turn enclosing and protecting the reflector and lamp and in addition providing a receptacle for a pressure plate and support member used in holding the sensitized film and graphic original in position for illumination. The entire apparatus, in a size suitable for copying most business documents, may be constructed to occupy a space no larger than approximately 14 x 10 x 10 inches.

A feature of the heater component is its ability to place and retain the exposed sensitized intermediate film and reactive receptor sheet in smooth face-to-face contact on the heating surface while providing for visual inspection of the progress of the image-forming reaction. Another feature is its ability to provide uniform temperature over the entire platen area without requiring mechanical blowers or similar heat-distributing means.

The invention will now be further described in terms of a specific exemplary embodiment as illustrated in the accompanying drawing, made approximately to scale unless otherwise indicated, and in which:

FIGURE 1 is a front elevation of the assembled apparatus with portions cut away to show interior structure,
FIGURE 2 is an end elevation similar to FIGURE 1,
FIGURE 3 is a transverse sectional elevation of the base or heater unit in open position,
FIGURE 4 is a partial end elevation showing the heater unit from the end opposite to that shown in FIGURE 2,
FIGURE 5 is a bottom plan view showing the interior of the exposure unit,
FIGURES 6 and 7 are schematic wiring diagrams for the exposure and heater units respectively, and
FIGURE 8 is a top plan view of a portion of the exposure unit.

The apparatus generally comprises a heater unit 10 and an exposure unit 11, held together for transport or storage by spring clips 12.

The heater unit comprises a hollow base 13 to which a heating platen 14 and a shield 15 are attached by screws 16. The unit also includes a transparent flexible screen 17 supported under tension in a frame 18 which is pivoted on a pin 19 attached to the base 13 through projecting tabs 20a. The platen 14 and shield 15, and end collar 21, define an enclosed space within which are located heating coils 22 and 23, a thermostat TS, and a thermal limit control TC. A closure member 24, FIGURE 4, extends from the base 13 across one end of the space between the base and the shield 15 and serves as a support for a switch 25 and a receptacle 26. The space remains open from the end opposite closure member 24, as shown in FIGURE 2, to provide for the storage of the connecting cord and plug 27.

The exposed surface of the platen 14 is preferably covered with a thin uniform fabric or floc held in place with a heat-resistant adhesive bond and providing improved uniformity of temperature as well as insulation against accidental direct and painful contact with the hot metal by an operator.

The approximate location of the heating elements 22 and 23 within the enclosed heater is indicated in FIGURE 3. Heat is imparted to the platen 14 both by absorption of radiant energy and by means of convection. The platen is thereby rapidly brought up to temperature and thereafter is maintained at such temperature within surprisingly close tolerances, so that accurate uniform reproductions are obtained. In an exemplary unit having a platen 11½ inches in length and curved on a 4½ inch radius, and designed for use on the customary 110 volt power supply, heating coils 22 have a resistance of 4.5 ohms, and coils 23 have a resistance of 2.9 ohms when tested at room temperature. At an operating temperature of about 250° F. on the platen, the resistances measure 4.9 ohms and 3.1 ohms respectively. The coils are supported by ceramic eyelet supports and extend nearly the full length of the enclosure. The thermostat and thermal limit control, not shown in FIGURE 3, are located within the enclosure, between the coils 23, and just above a coil 22, respectively.

The frame 18 consists of two spring strap members 28, a rear crosspiece 29 carrying support lugs fitting on support rod 19, and a front curved handle member 30 provided with terminal end pins 31. The crosspiece 29 and handle 30 are folded to receive and retain mounting strips 32 around which the ends of the screen 17 are secured. Open-mesh silk screen is preferred. The spring straps 28 hold the screen under tension so that as the frame 18 is lowered into closed position the screen applies pressure progressively across the curved surface of the platen 14. The screen is held in closed position during storage by means of end hooks 33 mounted on collars 21 and fitting over pins 31.

A flap 34 is hingedly affixed across the open front of the base by means of pins 34a carried by tabs 20. In the closed position, shown in FIGURE 2, the edge of the casing 37 of the exposure unit rests on this flap. Removal of the exposure unit permits the flap to be lifted and permits removal of the resilient pad 35 and pressure plate 36 normally stored within the hollow open base 13 and resting on ledges 63. The pad consists of a thin metal panel covered with a relatively thick resiliently compressible layer of interlaced fibers, sponge or the like. The pressure plate is conveniently a transparent glass plate having over its lower surface a light-transmitting thin uniform stratum of a binder containing a white pigment such as titanium dioxide, which may be applied directly to the glass or to a transparent plastic film which is then fastened over the glass surface; but untreated glass or other rigid transparent plate may alternatively be used.

The exposure unit 11 comprises a casing having a lower open portion 37 and an upper portion 38, the two being joined together in a peripheral overlap structure by screws 64 as illustrated in FIGURES 1 and 2. The upper portion of the casing is provided with a recessed top and includes a handle 39, an upper shelf 40, and a lower shelf 41 provided on the inner surface with extended bosses 42. One longitudinal edge of the lower shelf extends at an angle upwardly in the form of an extension 65 which is supplied with openings 43 for passage of air. The extension is omitted at the opposite side of the shelf 41, and a perforated baffle 48 is placed therebeneath, to provide at the side of the handle 39 a convenient storage space for the cord and plug 66.

At the end of the handle 39 there is provided a control button 44 making contact with a switch mechanism contained within a time control unit 45 suspended beneath the shelf 40 and regulated by a control handle or pointer 46 placed just above a scale 47 inscribed or applied to the exposed surface of the shelf, the switch and timer being indicated as S and T respectively in FIGURE 6.

An open reflector 49 having generally the shape of a truncated spheroid is mounted beneath the shelves 40 and 41 and the baffle 48 and onto bosses 42 by means of screws 51. As illustrated in the drawing, the reflector has a planar central portion and planar side and end portions at an obtuse angle therewith, for reasons of convenience and economy in manufacture; but the effect in terms of uniform diffuse reflection of light, is found to be nearly equal to that obtained with a true truncated spheroid.

The outwardly extended edges of the reflector 49 approach but fail to contact the walls of the casing 37, and the central portion of the reflector is provided with a number of small openings, so that air may flow between the space surrounding the lamp assembly and that above the reflector. The inner surface of the reflector, as well as the inner surfaces of the casing member 37, are painted or otherwise provided with a flat white surface to provide maximum diffuse reflection.

The reflector 49 in turn supports a lamp and reflector assembly 50 comprising a U-shaped supporting frame 53 fastened in place by rivets 67 and supporting between the legs of the U a lamp 54 and a reflector assembly 55. The tubular lamp 54 is supported between heat-resistant end caps 56 held in place by the spring tension of the frame 53. A cross-shaped wire frame 57 joins the ends of the legs of the frame, serving both to supply tension to the legs for support of the lamp and to hold in position the reversely arcuate or convex elliptical reflector 58. The lamp is connected to the electrical switch and supply system by wire conductors, not shown, passing through small grommeted openings 59 in the side walls of the reflector 49.

One leg of the U-shaped frame 53 terminates in a tubular receptacle 60 for the two contacting ends of the wire frame 57, which can therefore be removed when desired simply by separating the two ends against the spring tension of the wire. The other leg terminates in an open hook 61, permitting easy removal of the wire frame for access to the lamp 54 or for other purposes.

The elliptical reflector 58, which conveniently may be constructed of polished or buffed bright aluminum plate, is provided at its ends with tab extensions which are wrapped over the end segments of the shorter legs of the wire frame 57 to provide rigid fixed support for the reflector.

It has now been found that, by employing an exposure unit as hereinbefore generally described and illustrated and in which the following proportions are maintained, a substantially uniform intensity of illumination is obtained over the entire exposure area. As measured with a sensitive lightmeter, the variation is not more than about ±10% and may be held to within about ±5% over all but the extreme edge and corner areas. The uniformity is sufficient to permit the copying of printed documents by methods hereinbefore described without any observable localized light or dark spots or streaks in the completed copy.

The extreme height of the exposure unit as seen in FIGURE 5, i.e., the vertical distance between the plane of the exposure area and the flat peak of the generally ellipsoidal diffuse-reflecting shell 49, must be at least about one-half the length of the exposure area. The combination of shell 49 and casing section 37 is generally in the shape of an ellipsoid, truncated at a plane parallel to the major axis and at approximately three-fourths the minor axis, i.e. the extreme height of the section being approximately three-fourths the minor axis of the ellipsoid. At the same time the said extreme height is preferably about 1.4 or in any case between about 1.3 and about 1.6 times the distance between the plane of the exposure area and the center of the coiled filament of the lamp 54. The specular reflector 58 is generally elliptical, the length of the major and minor axes being porportional to the length and width of the exposure area respectively. The ratio of the length of the exposure area to the major axis of the reflector is within the range of 5.5±0.4. The reflector is preferably bowed convexly toward the lamp along its major axis, the radius of curvature being approximately one-half the extreme height of the exposure unit as previously defined. The reflector 58 is mounted at a distance below the lamp just sufficient to prevent the direct rays of the lamp from reaching the exposure area at the midpoint of each of the four sides thereof.

These requirements have been adequately met in a specific illustrative structure having the following dimensions:

|  | Inches |
|---|---|
| Exposure area | 9 x 12 |
| Extreme height | 6½ |
| Height of lamp | 4½ |
| Reflector: |  |
|     Major axis | 2.19 |
|     Minor axis | 1.63 |
|     Distance from lamp | .83 |
|     Radius of curvature | 3 |

A particular lamp which has given excellent results is the FAB quartz iodine lamp, 650 watts, having a tungsten filament wound into a coil about ⅛" in diameter and about ⅝" long, centrally supported within a quartz tube containing iodine and argon under pressure.

Any variation in size of exposure area desired will of course require corresponding changes in the other dimensions given. Thus for a generally square exposure area the major and minor axes of the reflector 58 may be identical. For lamps with a more nearly point source of light some appropriate adjustment of axis ratios or of spacings may be required. However the combination of the semi-convex specular reflector 58 in close proximity to the lamp and contained within a diffuse-reflective generally hemiellipsoidal enclosure, all as hereinbefore described and illustrated, has been found to provide adequately uniform illumination for the critical purposes indicated while permittng a degree of compactness and simplicity not believed available heretofore.

The operation of the apparatus will be described for convenience in terms of preparing a copy of a printed page, using light-sensitive intermediate film and reactive receptor sheet materials as previously described herein.

The apparatus is first dis-assembled. The spring clips are unfastened and the exposure unit is lifted from the heater unit. The flap 34 is then lifted and the pad 35 and plate 36 removed. The hooks 33 are released and the frame 18 permitted to spring to the open position indicated in FIGURE 3. The cord of the heater unit is plugged into a suitable electrical outlet and the switch 25 turned on, thus bringing the heater to the pre-set operating temperature as required for the specific copy-sheet materials. The exposure unit is also connected to an electrical outlet, for example to the receptacle 26, and the control handle 46 adjusted to the correct setting.

The printed page is placed on the resilient surface of the pad 35 with the printed surface exposed, and is covered with the sensitized film and with the pressure plate 36. The exposure unit is then set over the plate, being supported by the projections 62, and the button 44 is pushed to activate the lamp and timer circuit, thus exposing the film for the required number of seconds.

As soon as the lamp is extinguished, the exposure unit and plate 36 may be removed. The exposed sensitized film is placed against the reactive paper and the two are placed against the screen 17 with the film toward the screen. The whole is then lowered and held against the surface of the heater platen under hand pressure, applied on handle 30, sufficient to prevent any wrinkling or unevenness in the copy and for a time sufficient to produce the desired depth of image color without causing any significant color change at background areas, the development of the image being readily visible through the translucent or transparent film and screen. The frame is then lifted and the copy removed, the used sensitized film being discarded.

As the exposure unit is removed from the pad and plate assembly, and again as it is placed on the desk or table surface prior to introducing a further assembly of film and original, the lifting and lowering action causes a flow of air through the unit and through the openings provided. The heat generated by the high intensity lamp is thus effectively dissipated so that the temperature of the unit is automatically and necessarily maintained at reasonable level during continuous use.

What is claimed is as follows:

1. Copying apparatus useful in preparing copies of graphic originals by a process involving uniform exposure of a said original through a light-desensitizable intermediate film held in position for reflex exposure and in smooth uniform contact with said original and then uniformly heating the thus exposed film in contact with a receptor sheet reactive with said intermediate film to form on said sheet a visible copy of said original, said apparatus including, in combination: a box-like exposure unit comprising an open-sided interiorly diffusely light-reflective housing, a light source suspended within said housing centrally above the open bottom side thereof, and a convex specular reflector facing said source and between said source and said open side; a heating unit having a hollow base, a semicylindrically curved heating platen and a transparent pressure-covering for said platen, one edge of said base being open and provided with an openable flap covering; and sheet-holding means comprising a resilient pad and a transparent pressure plate supported within said hollow base and retained therein by said openable covering; said heating unit serving as a removably attached base for said exposure unit, the said platen fitting within the said housing and into close proximity to said convex reflector, and said exposure unit serving to cover and protect said heating unit and to maintain said openable covering in closed position for retention and protection of said sheet-holding means.

2. Copying apparatus comprising, in combintion, an exposure unit forming a cover member, a heating unit forming a base member, and sheet-holding means held within said base member by said cover member, and wherein the said exposure unit is further characterized as comprising: an open-sided box-like interiorly diffusely light-reflective housing, the edges of the open side defining an exposure area having a lengthwise and a widthwise dimension, and the maximum height of said housing being at least one-half of said lengthwise dimension; a high intensity light source suspended within said housing centrally above the open side thereof and at a distance from said exposure area such that the ratio of the maximum height of said housing to the height of said light source above the axposure area is between about 1.3 and about 1.6; and a generally elliptical specular reflector suspended beneath said lamp and screening the center-lines of said exposure area from direct exposure to said light source while permitting uniform exposure of said area to diffusely reflected light therefrom.

3. Copying apparatus comprising, in combination, an exposure unit forming a cover member, a heating unit forming a base member, and sheet-holding means held within said base member by said cover member, and wherein the said exposure unit is further characterized as comprising: an interiorly diffusely light-reflective housing in the form generally of an ellipsoid truncated at a plane parallel to the major axis and at approximately three-fourths of the minor axis to form a dome-like shell having an open side, the edges of the open side defining an exposure area, the maximum height of said shell above said exposure area being at least one-half the length of said area; a concentrated high intensity light source suspended within said shell centrally above said exposure area at a height of about 0.7 the said maximum height; a semi-convex generally elliptical specular reflector having a major axis equal to about 1/5.5 the length of said exposure area and suspended beneath said light source in a position to screen the lengthwise and widthwise centerlines of said exposure area from direct exposure to said light source; and control means for activating said light source for a predetermined exposure interval.

4. An exposure unit suitable for use in the copying of graphic originals by processes involving uniform reflex exposure as herein described and comprising: a casing including a lower internally diffusely reflective portion open at the bottom side, the edges of the open side defining an exposure area, and an upper portion having an outer longitudinally central depression surmounted by a handle member; a generally hemi-ellipsoidal dome-like internally light-diffusing reflector within said housing with its open side facing the open bottom and with its furthermost point at a distance from said exposure area equal to at least one-half the lengthwise dimension of said area, the edges of said dome-like reflector being free of contact with the walls of said casing to form therebetween a narrow channel for passage of air; a light source centrally suspended beneath said dome-like reflector at a distance from the plane of the exposure area equal to about 1/1.4 the distance from said plane to said reflector; a generally elliptical semiconvex specular reflector suspended beneath said light source, the major axis of said specular reflector being about 1/5.5 the length of the exposure area, and said reflector being so proportioned and positioned as to just screen the exposure area along its lengthwise and widthwise central portions from direct exposure to said light source; control means, mounted at one end of said centrally depressed upper portion, for activating said light source for a predetermined exposure interval; the walls of said central depression being sufficiently open to permit free flow of air therethrough and through said narrow channel between said casing and said dome-like reflector.

5. An exposure unit comprising a domed open-sided reflector body, a light source within said domed body, and a specular reflector within said body and between said light source and the open side, said unit being further characterized in comprising: a U-shaped support member, the base of the U being mounted at the peak of the domed reflector with the arms of the U extending toward the open side; a pair of open-ended sockets oppositely disposed intermediate the ends of said arms and in position to support a tubular lamp member therebetween; a tubular high intensity lamp supported by said sockets; one of said arms terminating in an open-ended tubular receptacle, the other in an open outwardly facing hook structure; a wire loop joining the free ends of said arms, passing through said loop and around said hook; and an elliptical, longitudinally convex, specular reflector attached to said wire loop midway between the ends thereof and toward said lamp; the reflector screening an exposure area corresponding to the open side of said domed body from direct exposure to said lamp while permitting uniform exposure of said area to diffusely reflected light therefrom.

6. Copying apparatus comprising, in combination, an exposure unit forming a cover member, a heating unit forming a base member, and sheet-holding means held within said base member by said cover member, and wherein the said heating unit is further characterized as comprising: an upwardly bowed arcuate platen; a plurality of electrical heating units suspended beneath said platen for supplying heat thereto by both radiation and convection, said units being so distributed as to supply larger quantities of heat at greater distances from the peak of said platen; control means for actuating said heating units and for maintaining a predetermined platen temperature; and pressing means including a transparent heat-resistant flexible web stretched between elongate end supports by intervening leaf spring side members forming with said supports a tension frame for said web, one of said supports being hingedly attached at one side of said platen, the other of said supports forming a handle member for progressively pressing said web against said platen.

7. A heating unit suitable for use in the development of visible copies of graphic originals by processes involving heat-induced inter-reaction of a reflex-exposed intermediate film and a reactive receptor sheet as herein described and comprising: a base; an upwardly transversely rounded sheet-metal platen mounted on said base and having over its outer surface a thin uniform fibrous protective insulating covering; a plurality of elongate heating elements disposed beneath said platen and parallel to its lengthwise dimension and including a relatively high-energy-output element adjacent each longitudinal edge thereof, any additional elements being equally distributed on both sides of the center of said platen and having relatively lower energy output; and a spring tension frame assembly having rigid end bars connected by flat spring side members, one said end bar being hingedly connected at one longitudinal edge of said platen, the other end bar being provided with handle means, a transparent heat-resistant flexible pressing web being stretched between said end bars.

No references cited.

EVON C. BLUNK, *Primary Examiner.*